Patented Apr. 7, 1953

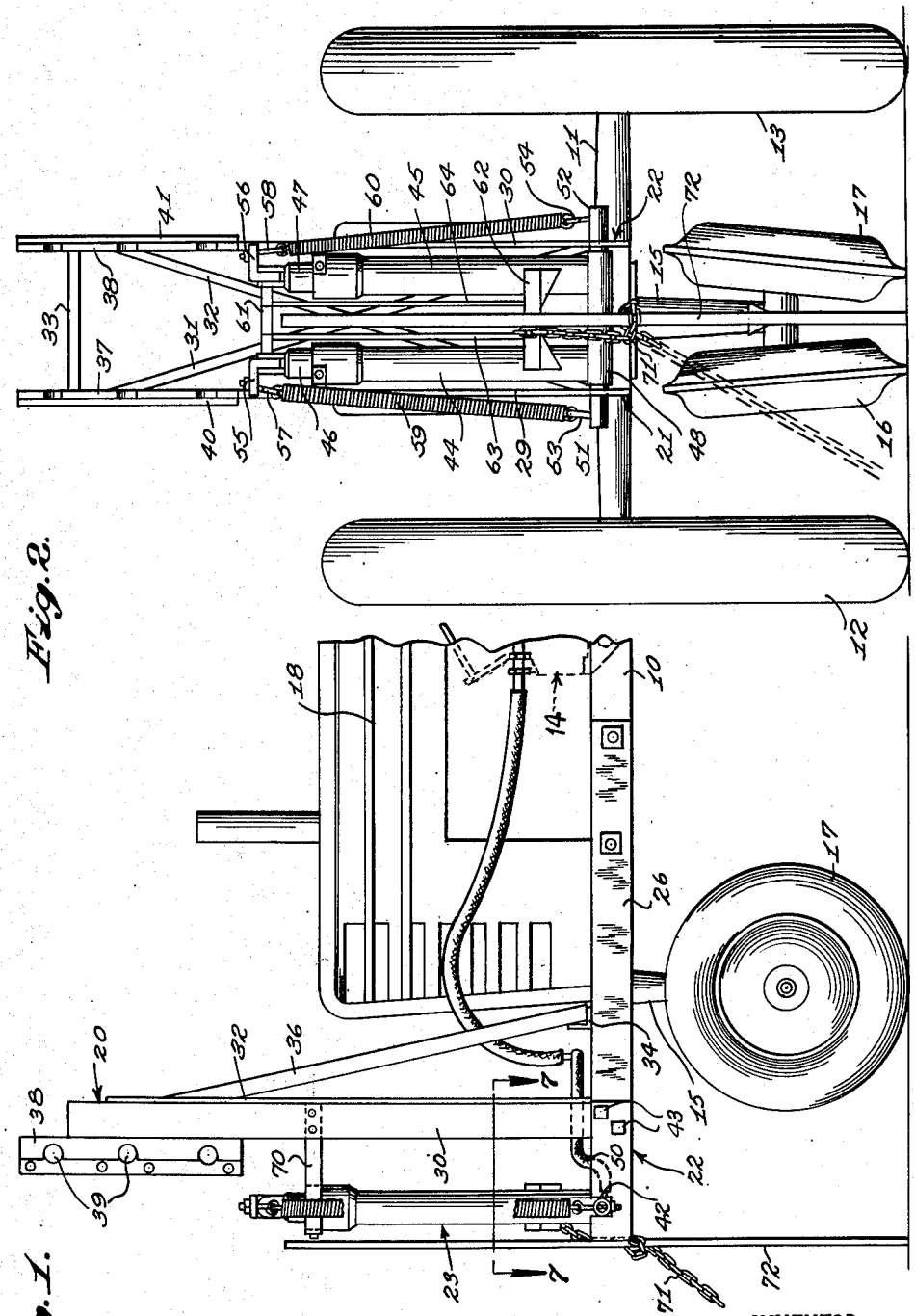

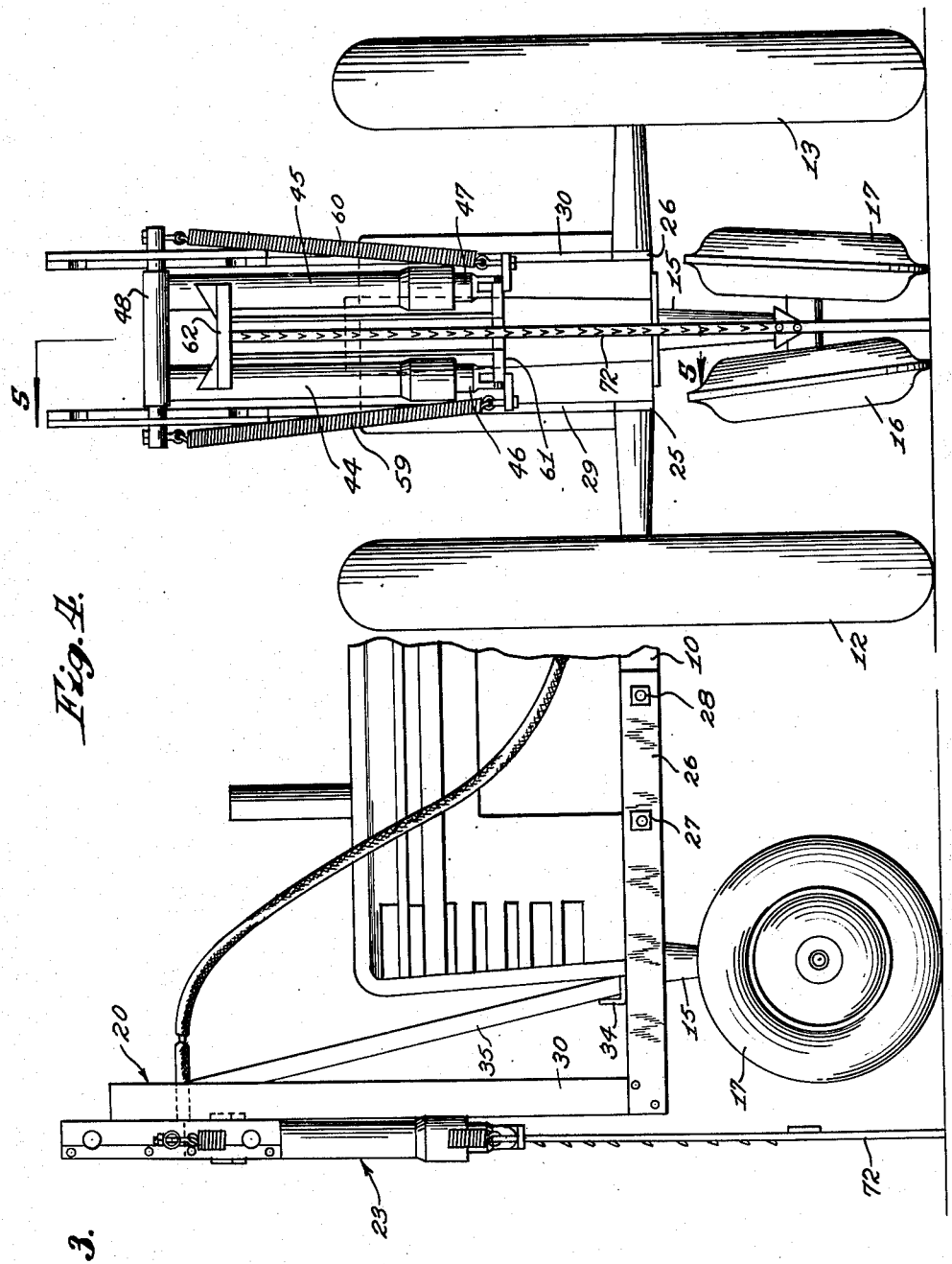

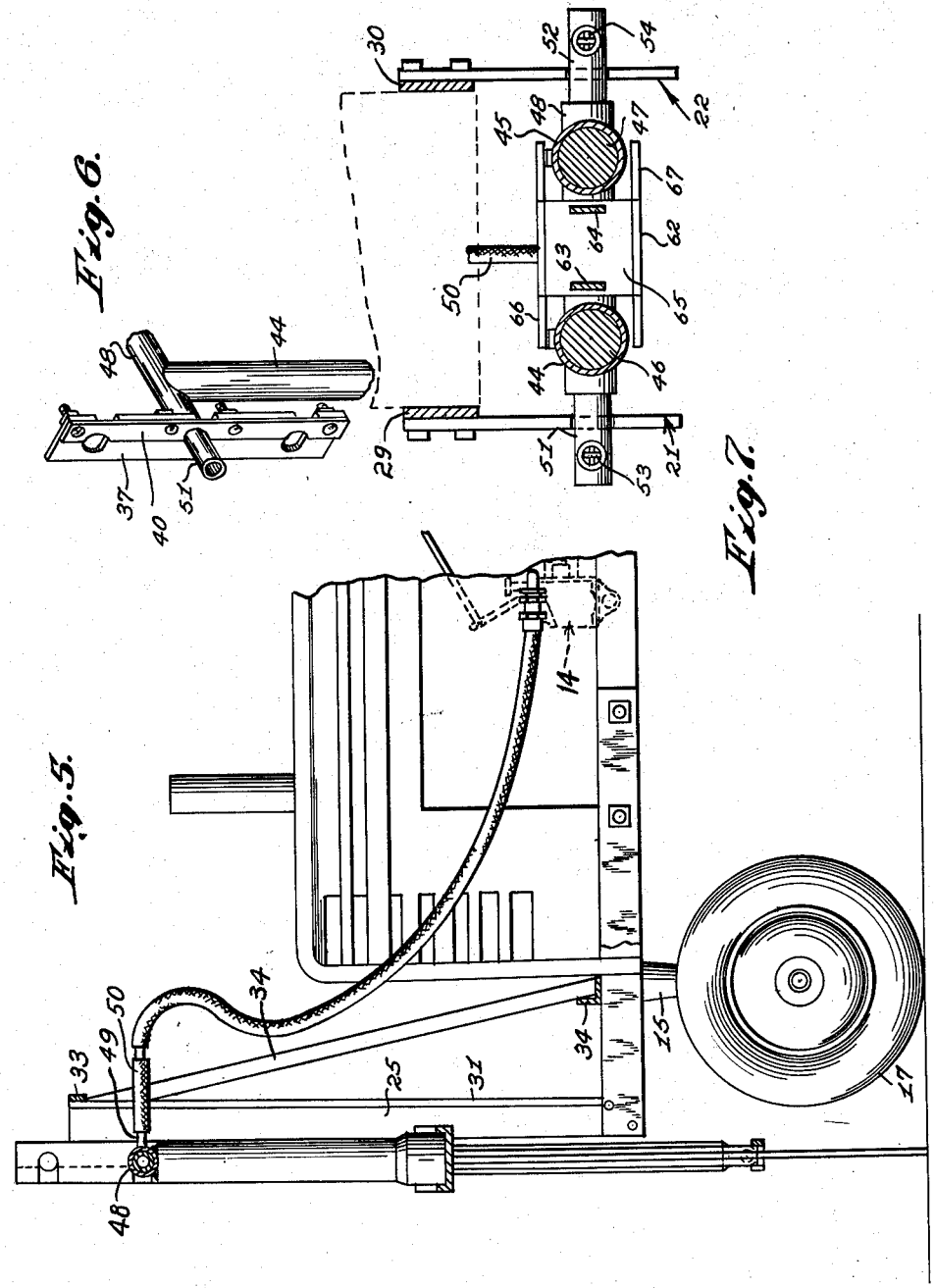

2,634,092

UNITED STATES PATENT OFFICE 2,634,092

TRACTOR ATTACHMENT FOR DRIVING AND PULLING FENCE POSTS

Floyd F. Lindquist, Webster City, Iowa

Application January 26, 1951, Serial No. 207,905

3 Claims. (Cl. 254—29)

This invention relates to tractor attachments for driving and pulling fence posts and for similar purposes and more particularly to an attachment which can be mounted on an existing farm tractor and powered by the hydraulic system of the tractor.

It is among the objects of the invention to provide an improved post driving and pulling attachment for a tractor having a hydraulic system which can be quickly and easily mounted on an existing tractor and connected to the tractor hydraulic system for power operation in the driving or pulling of fence posts or similar operations; which includes a tractor mounted frame and a hydraulic unit detachably mounted on the frame and invertible for changing the operation of the attachment; which provides ample power for driving and pulling ordinary metal fence posts; and which is simple and durable in construction, economical to manufacture, easy to use, and positive and effective in operation.

Other objects and advantages will become apparent from a consideration of the following description and the appended claims in conjunction with the accompanying drawings wherein:

Figure 1 is a side elevational view of a fragmentary front portion of a farm tractor showing a fence post driving and pulling attachment illustrative of the invention operatively mounted on the frame of the tractor;

Figure 2 is a front elevational view of the tractor and attachment illustrated in Figure 1;

Figure 3 is a side elevational view similar to Figure 1, but showing the parts of the attachment in a different operative arrangement from that illustrated in Figures 1 and 2;

Figure 4 is a front elevational view similar to Figure 2, but showing the parts of the attachment in the operative arrangement illustrated in Figure 3;

Figure 5 is a cross sectional view on the line 5—5 of Figure 4;

Figure 6 is a perspective view of a fragmentary portion of the attachment showing structural details thereof; and Figure 7 is a cross sectional view on the line 7—7 of Figure 1.

With continued reference to the drawings, the tractor illustrated is a conventional form of farm tractor having a frame 10 supported at its rear end on a rear axle 11 carried by rear driving wheels 12 and 13 and supported at its front end on a column 15 and steerable front wheels 16 and 17 mounted at the lower end of the frame supporting column 15. The tractor carries an engine enclosed in a hood 18 and drivingly connected to the rear axle 11 in the well known manner, and includes various other components, such as steering mechanism, drive control mechanism, a seat, and towing mechanism all well known to the art and unnecessary to illustrate and describe for the purposes of the present disclosure. The tractor also includes a hydraulic pressure system generally indicated at 14 of a form well known to the art having extension connections to which extension conduits or hoses may be connected and controlled by a suitable manually operated valve, not illustrated.

The tractor illustrated is known as a row crop cultivating tractor having widely spaced apart rear wheels and small front wheels disposed close together at the lower end of the column 15 and mounted on a common axle. It is to be understood, however, that the attachment of the present invention may be mounted on various types of tractors equipped with hydraulic systems without in any way exceeding the scope of the invention.

The attachment of the present invention comprises, in general, a frame 20 mounted at its lower end on the front end of the tractor frame 10 and projecting vertically upward from the latter, brackets 21 and 22 detachably secured to the frame at the bottom end thereof and projecting forwardly of both the attachment frame and the tractor frame and a hydraulic unit 23 detachably mounted on the frame 20 and invertible in position to change the operation of the fence post driving and pulling attachment.

The frame 20 comprises two horizontally disposed base members 25 and 26 disposed one along each side of the tractor frame 10 in spaced apart and substantially parallel relationship to each other. Each of these frame base members is detachably secured to the tractor frame by bolts, as indicated at 27 and 28, spaced apart longitudinally of the base member and the two base members project forwardly of the front end of the tractor frame, as is clearly illustrated in Figures 1, 3 and 5. Two standards 29 and 30 in the form of metal bars of elongated, rectangular cross sectional shape extend upwardly, one from each of the frame base members 25 and 26 at the forward ends of the base members. The lower end of each standard is rigidly secured to the upper edge of the corresponding base member by suitable means, such as welding, and the standards are disposed substantially perpendicular to the base members and the tractor frame and are vertically disposed when the tractor is supported on a substantially horizontal supporting surface.

The two standards 29 and 30 are supported in spaced apart and substantially parallel relationship to each other by bracing connected to the rear edges of the standards and including a pair of cross braces 31 and 32 and a transverse brace 33 near the upper ends of the standards, as is particularly illustrated in Figure 2.

A cross bar 34 of right angular cross sectional shape is secured at its ends to the upper edges of the frame base members 25 and 26 and extends across the space between these base members and across the front end of the tractor frame immediately in front of the engine hood 18 and upright braces 35 and 36 extend from the opposite ends of the cross bar 34 upwardly and forwardly to the rear edges of the standards 29 and 30 respectively terminating at the lower edge of the top cross brace 33 which is disposed at the upper ends of the standards, as is particularly illustrated in Figure 5, to support the standards in upright position relative to the corresponding frame base members 25 and 26.

Elongated blocks 37 and 38 are secured to the standards 29 and 30 respectively at the upper ends of the standards and extend forwardly from the forward edges of the standards. These blocks extend above and below the upper ends of the standards and each block is provided in its forward edge with a series of notches 39 spaced apart longitudinally of the block. Guard plates 40 and 41 are detachably secured to the blocks 37 and 38 respectively at the opposite sides of the blocks and project forwardly of the front or forward edges of the blocks. These guard plates are provided with notches complementary to the notches 39 in the corresponding blocks, and together with the blocks provide series of vertically spaced apart sockets at the upper end of the frame.

The brackets 21 and 22 are metal bars of elongated, rectangular cross sectional shape each provided near one end with two spaced apart bolt holes and near its other end with a notch 42 extending inwardly from one longitudinal edge thereof. These brackets are detachably secured to the frame base members 25 and 26 respectively, by suitable means, such as the bolts 43 extending through registering apertures in the brackets and the frame base members 25 and 26 near the forward ends of the base members and these brackets extend substantially in longitudinal alignment with the corresponding base members 25 and 26 forwardly of the standards 29 and 30. When the brackets are properly attached to the frame base members 25 and 26, the notches 42 are in the upper edges of the brackets and provide a pair of lower sockets for supporting the hydraulic unit 23.

The hydraulic unit 23 comprises a pair of coterminous piston and cylinder assemblies disposed in spaced apart and substantially parallel relationship to each other and including cylinders 44 and 45 each having an open end and a closed end and elongated pistons or rams 46 and 47 reciprocably mounted in the cylinders 44 and 45 respectively and projecting from the open ends of the cylinders.

A tubular head 48 extends across the closed ends of the cylinders 44 and 45 and is rigidly secured to the cylinders. This head communicates interiorly with the interiors of both cylinders and a fitting 49 projects laterally from the head for the attachment thereto of a hydraulic conduit 50 which connects the hydraulic unit to the hydraulic system of the tractor.

Arbors 51 and 52 project from the respectively opposite ends of the head 48 closing the ends of the head, and apertured lugs 53 and 54 project laterally from the arbors 51 and 52 respectively.

The arbors are receivable in the sockets provided by the blocks 37 and 38 or in the sockets provided by the brackets 21 and 22 to support the hydraulic unit on the frame 20, in either an upright or an inverted position.

Right angular terminals 55 and 56 are secured to the pistons 46 and 47 at the ends of the pistons projecting out of the open ends of the corresponding cylinders 44 and 45 and these terminals have legs directed away from each other and carrying apertured lugs or eye pins 57 and 58 respectively.

A coiled compression spring 59 is connected between the lugs 53 and 57 and disposed along the outer side of the cylinder 44 and a similar coiled compression spring 60 is connected between the lugs 54 and 58 and disposed along the outer side of the cylinder 45. These compression springs 59 and 60 resiliently urge the pistons inwardly of the cylinders, the pistons being forced outwardly of the cylinders by hydraulic fluid under pressure admitted into the head 48 and the closed ends of the cylinders from the hydraulic conduit 50.

A cross bar 61 extends between the terminals 55 and 56 and is secured at its opposite ends to these terminals and a crosshead 62 is disposed between the cylinders 44 and 45 at a location spaced from the cross bar 61 and is slidable longitudinally of the cylinders. The cross bar is connected to the crosshead by a pair of spaced apart and substantially parallel struts 63 and 64 disposed between the cylinders 44 and 45 in spaced apart and substantially parallel relationship to each other.

The crosshead 62 comprises a rectangular plate 65, as is particularly illustrated in Figure 7, disposed between the cylinders 44 and 45 and bars 66 and 67 secured to the plate along respectively opposite edges of the latter and overlapping the sides of the cylinders to guide the crosshead in its movements of reciprocation longitudinally of the cylinders.

When the attachment is used for pulling posts, the brackets 21 and 22 are applied, as shown in Figures 1 and 2, and the arbors 51 and 52 are mounted in the notches in these brackets with the cylinders 44 and 45 extending upwardly along the standards 29 and 30 respectively. Straps, as indicated at 70 in Figure 1, extend from the upper ends of the cylinders to the corresponding standards and are detachably secured to the cylinders and the standards to secure the cylinders in upright position substantially parallel to the standards. With the hydraulic unit in this inverted position, the crosshead 62 is disposed below the cross bar 61. A chain or other suitable flexible strand 71 may now be wrapped about a metal fence post 72 at a convenient location above the ground and connected to the crosshead 62 of the hydraulic unit. Hydraulic fluid under pressure may now be admitted to the tubular head 48 and to the lower closed ends of the cylinders forcing the pistons 46 and 47 upwardly, raising the cross bar 61 and the crosshead 62 and pulling the post upwardly out of the ground.

When the attachment is used for driving fence posts, the arbors 51 and 52 are disposed in selected notches 39 in the blocks 37 and 38 and secured in these notches by the guard plates 40 and 41 thereby securing the hydraulic unit to the frame in upright position. The brackets 21 and 22 and the straps 70 are removed and the cylinders 44 and 45 now extend along and are contiguous to the corresponding standards 29 and 30. The fence post 72 is now placed with one end on the ground at the location at which it is desired to drive the post and with its upper end immediately below the crosshead 62, the crosshead 62 now being above the cross bar 61. Hydraulic fluid is now admitted to the tubular head 48 and to the upper closed ends of the cylinders 44 and 45 forcing the pistons 46 and 47 downwardly and lowering the cross bar 61 and the crosshead 62, forcing the post 72 downwardly into the ground.

In either case, when the post has been pulled or driven, the hydraulic fluid is released from the cylinders and the head 48 by turning the manually operated valve to "off" or drain position and the springs 59 and 60 then return the pistons to their retracted position relative to the corresponding cylinders.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tractor having a frame and a hydraulic system, a fence post driving and pulling attachment comprising an attachment frame mounted on said tractor frame, and a hydraulic unit mounted on said attachment frame, said attachment frame including substantially horizontally disposed brackets secured to said tractor frame and projecting forwardly from the front end of the latter, and vertically disposed standards secured at their lower ends one to each of said brackets between the front ends of said brackets and said tractor frame, and said hydraulic unit comprising a pair of cylinders disposed in spaced apart and substantially parallel relationship to each other, a tubular head secured to said cylinders at one end of said pair of cylinders and communicating interiorly with the interiors of said cylinders, a hydraulic conduit connected to said head for connecting the interiors of said cylinders with said tractor hydraulic means, means on the ends of said head engageable with said attachment frame and supporting said hydraulic unit on said frame, pistons slidably disposed one in each cylinder and projecting from the ends of said cylinders remote from said head, spring means connected between said head and said pistons resiliently urging said pistons inwardly of said cylinders, a cross bar interconnecting said pistons at the ends of the latter projecting from said cylinders, a post engaging cross head disposed between said cylinders, and stout means connecting said cross bar to said cross head.

2. In combination with a tractor having a frame and a hydraulic system, a fence post driving attachment comprising an attachment frame mounted on said tractor frame and extending forwardly of the front end of the tractor frame, and a hydraulic unit mounted on said attachment frame, said attachment frame including a pair of standards substantially vertically disposed in spaced apart relationship to each other and means mounting said standards at their lower ends on said tractor frame, and said hydraulic unit including at least one cylinder substantially vertically disposed, means on said cylinder at the upper end thereof attaching said cylinder to said standards and connecting the interior of said cylinder to said tractor hydraulic system for applying hydraulic pressure interiorly of said cylinder, piston means reciprocable in said cylinder and extending out of the lower end of the cylinder, a crosshead movable longitudinally of said cylinder, means connected to said piston means below the lower end of said cylinder and to said crosshead connecting said piston means to said crosshead for movement of the crosshead downwardly along said cylinder by said piston means in response to the application of hydraulic fluid under pressure to the interior of said cylinder, and at least one spring fixed at one end relative to said cylinder at a location above the lower end of said cylinder and connected at its other end to said piston below the lower end of said cylinder for moving said crosshead upwardly along said cylinder when the hydraulic fluid pressure in said cylinder is released, said crosshead being engageable at its under side with the top end of a fence post to drive the post into the ground.

3. In combination with a tractor having a frame and a hydraulic system, a fence post pulling attachment comprising an attachment frame mounted on said tractor frame and including substantially horizontally disposed brackets secured to said tractor frame and projecting forwardly from the front end of the tractor frame and each having a notch in the upper edge thereof and vertically disposed standards secured at their lower ends one to each of said brackets between the corresponding bracket notch and the front end of said tractor frame, and a hydraulic unit mounted on said attachment frame and comprising at least one substantially vertically disposed cylinder, means projecting from said cylinder at the lower end of the cylinder and received in said bracket notches supporting said cylinder on said attachment frame, fluid conduit means extending from said cylinder at the lower end thereof connecting the interior of said cylinder with the hydraulic system of the associated tractor for applying hydraulic fluid under pressure to the interior of said cylinder, means connecting said cylinder at a location above the lower end thereof to at least one of said standards, piston means reciprocable in said cylinder and moved outwardly of the upper end of the cylinder by the pressure of hydraulic fluid in said cylinder, a crosshead movable longitudinally of said cylinder, means connecting said piston means at the upper end thereof to said cross-head for movement of said crosshead upwardly along said cylinder by said piston means in response to the application of hydraulic fluid under pressure to the interior of said cylinder, and at least one spring fixed at one end relative to said cylinder at a location below the upper end of said cylinder and connected at its other end to said piston above the upper end of said cylinder for moving said cross head downwardly along said cylinder when the hydraulic pressure in said cylinder is released.

FLOYD FREDRICK LINDQUIST.

REFERENCES CITED

The following references are of record in the file of this patent:

UNITED STATES PATENTS

| Number | Name | Date |
| --- | --- | --- |
| 1,950,640 | Twyman | Mar. 13, 1934 |
| 2,244,899 | Smith | June 10, 1941 |
| 2,402,393 | Griffith | June 18, 1946 |